Patented June 2, 1953

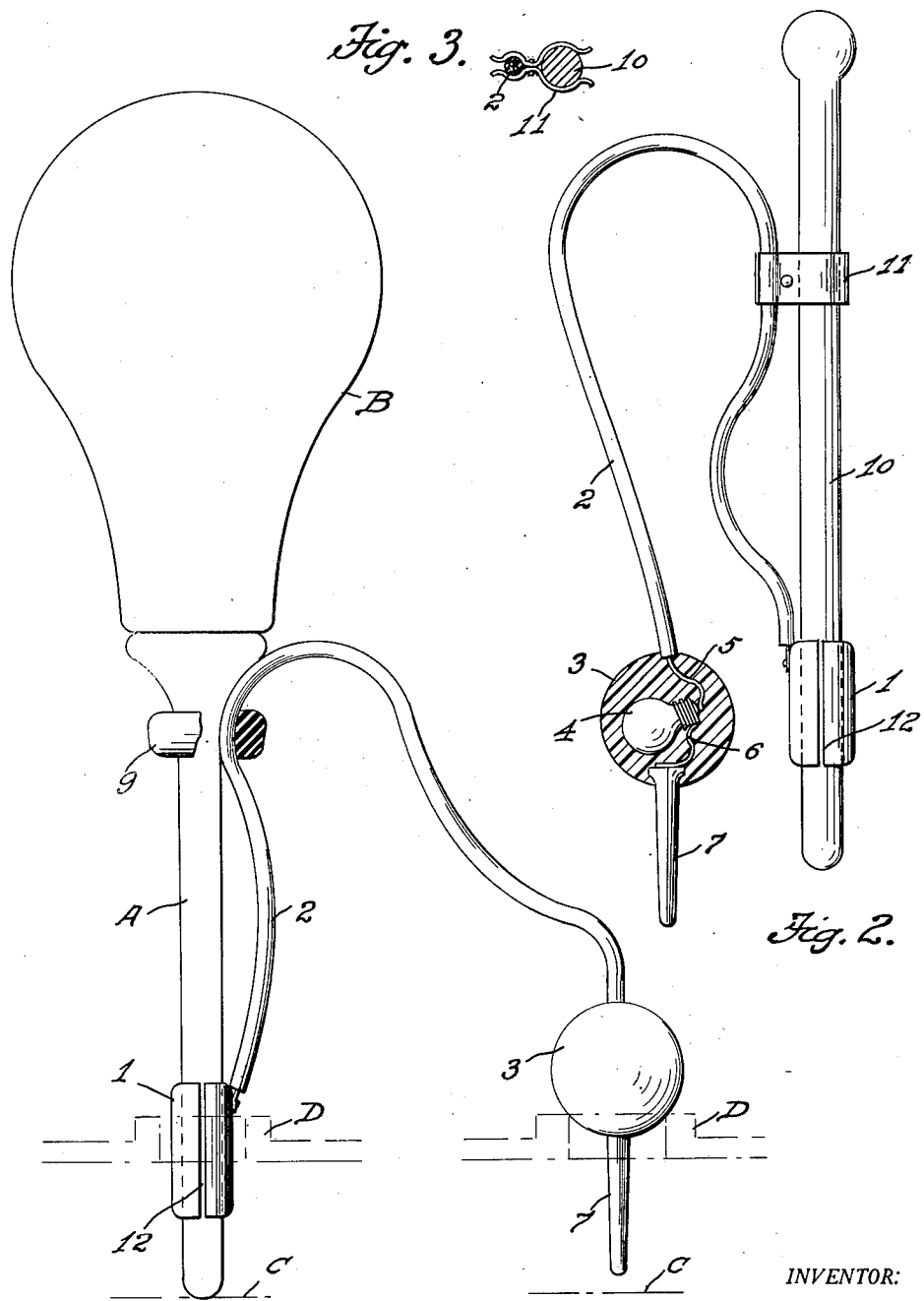

2,640,976

UNITED STATES PATENT OFFICE 2,640,976

ELECTROLYTE LEVEL INDICATING ATTACHMENT

Joseph F. Prohaska, Los Angeles, Calif.

Application November 30, 1951, Serial No. 259,107

5 Claims. (Cl. 340—244)

This invention relates to a device for indicating the electrolyte level in the cells of storage batteries such as generally used in automotive vehicles.

Since it is most important to make certain that the cells of the battery contain sufficient electrolyte to insure dependable functioning of the battery it is common practice, when the vehicle stops at the service station for refilling of the gasoline tank, to have the service man check the battery; but the batteries of modern motor cars frequently are placed in out-of-the-way positions where it is difficult to obtain a direct view through the inlet openings of the cells. This condition is particularly aggravated when there is insufficient light clearly to expose the surface of the electrolyte through these inlets, making it necessary for the attendant to fetch a light of some kind to the place where the battery is located.

It is in view of the foregoing the object of the present invention to provide a simple and inexpensive device which is fitted with elements that may be inserted in the cells of a battery and which, if the electrolyte level is too low, will give clear indication of such condition. More particularly it is the object of the invention to provide a level indicating device which may be attached to the type of battery filler syringes found in the average service station or, if such filler syringe is not available, may be attached to any suitable rod made from insulating material. Another object is to provide a device including a light which, when in filling the battery the required level is reached, will become ignited and so warn the attendant to discontinue the filling operation. A further object is to provide a device which may readily be adjusted to accommodate structural variations in the batteries to the end that the device may be quickly set to indicate the required electrolyte level of the types of batteries in commercial use.

With these and other objects in view the invention resides in the combinations fully described and illustrated in the accompanying drawing, of which a preferred form of the invention is shown.

In the drawing:

Fig. 1 shows the device of the invention as it appears when applied to the battery of a motor car;

Fig. 2 shows a slightly modified form of the invention; and

Fig. 3 is a detail view of one of the clamping elements of the device.

Referring in the first instance to Fig. 1, it is noticed that the device of the invention is attached to a battery filler syringe such as ordinarily used in service stations and that it consists of a tubular shank A made from rubber or other current insulating material and having at the upper end thereof the usual rubber bulb B. The device of the invention consists of a sleeve 1 of a size to be pressed in position on the shank of the syringe and which is made from current conducting material, preferably lead, to form one of the electrodes of the device. An insulated conductor 2 in the form of an ordinary flexible electric light wire extends from this electrode to a spherical member 3 and this member is made from suitable transparent or translucent current insulating material, within which is placed a small electric light bulb 4. The wire 5 of this flexible conductor is rigidly secured to one of the contacts of this bulb. A second wire 6 extends from the other contact of the bulb to a stem 7 which is firmly anchored in the material of the spherical member and downwardly extending therefrom, to form the second electrode of the device.

When it is desired to check the electrolyte level of the battery, it is merely required to remove the caps from the end cells thereof and to insert the lower ends of the filler shank A and of the stem 7 of the spherical member into the exposed openings D of the battery cells. In doing this, it is found that the lower end of the filler shank will come to rest on top of the plates of the cell C but that the spherical member 3 will come to rest on the flange D at the opening of the other cell of the battery. It is important to note that the stem 7 is not quite long enough to reach the battery plates of the cell into which it is inserted. If the electrolyte level within the cell C is high enough to reach the electrode 1, it is found that a circuit will be closed through the light bulb 4 which then becomes ignited to give clear evidence that no further filling is required; but if the electrolyte level is not high enough to reach the electrode 1, it is merely required for the attendant to compress the rubber bulb B to cause additional liquid to flow into the cell and this is continued until the electrode 1 is reached to close the circuit to ignite the light bulb.

It is the important feature of the invention that the device may be attached to the battery filler syringe without in any way disturbing or altering this appliance and that it may readily be detached therefrom when such inspection is not required; also that the device is so simple and convenient to operate that there is no danger of any part thereof getting out of order. It may, however, be found desirable to secure the conductor 2 in position on the shank of the syringe intermediate the ends thereof so as to prevent this conductor from becoming entangled with projections on top of or near the upper surface of the battery, and this may readily be done by means of a soft rubber sleeve 9 of a size and shape tightly to fit the upper end of the filler shank A. In practice, the electrode 1 of the device is first passed through this sleeve which thereupon is pushed in position on the filler stem at the same time that the electrode 1 is mounted in position thereon. This sleeve will maintain the middle portion of the conductor 2 in position well above the upper surface of the battery so that no danger of entanglement is present.

While the device of the invention is primarily adapted for attachment to a battery filler syringe it may, as indicated in Fig. 2, be placed on a rod 10 of wood, or other insulating material, so as to enable any one to whom the use of such syringe is not available to determine the electrolyte level within a battery. This is particularly advantageous in rural districts which are so far removed from service stations that the motor car owner keeps in store gasoline and battery solution for use when a service station cannot conveniently be reached. In this view I have shown the conductor 2 attached to the rod by means of a resilient clip 11 one end of which grips the insulated conductor 2 and the other end of which is pushed in position on the rod to be retained in position thereon by its resilience. But I wish it understood that any other suitable attaching means may be substituted.

It may be found advantageous to slit the wall of the sleeve 1 lengthwise, as indicated at 12, to the end that finger pressure applied thereto may suffice tightly to clamp the sleeve in position on the shank or rod. It was above stated that the stem 7 is not quite long enough to reach the battery plates but that the spherical member will come to rest on the flange at the opening of the cell. This arrangement is most convenient and entirely satisfactory where the level of the electrolyte within the cell reaches the stem. Should it, however, be found that no circuit is closed, it would indicate that the electrolyte had sunk to a level below the stem. In such cases, it would merely be required to hold the stem in contact with a post or strap of the battery to close the circuit through the light bulb.

It is seen from the foregoing that I have provided a very simple and inexpensive device which may be readily attached to a rod on the tubular stem of a filler syringe and as readily detached therefrom. But while I have herein described a preferred form of the invention, right is reserved to embody therein modifications within the scope of the claims hereto appended.

I claim:

1. An attachment to a battery filler syringe comprising, a current conducting sleeve mountable on the shank of the syringe, a transparent non-conducting member, an electric light bulb molded into said member, a flexible conductor leading from said sleeve to one contact of said light bulb, a current conducting stem molded into and projecting from said member, and a wire within the member connecting the other light bulb contact with the said stem.

2. An attachment to a battery filler syringe comprising, a current conducting sleeve mountable on the shank of the syringe, a transparent non-conducting member, an electric light bulb molded into said member, a flexible conductor leading from said sleeve to one contact of said light bulb, means mountable on the syringe shank for attaching said flexible conductor intermediate its end to the shank above said sleeve, a current conducting stem molded into and projecting from said member, and a wire within the member connecting the other light bulb contact with the said stem.

3. An attachment to a battery filler syringe comprising, a current conducting sleeve mountable on the shank of the syringe, a transparent non-conducting member, an electric light bulb molded into said member, a flexible conductor leading from said sleeve to one contact of said light bulb, a resilient clip gripping said flexible conductor and seatable on the syringe shank above said current conducting sleeve, a current conducting stem molded into and projecting from said member, and a wire within the member connecting the other light bulb contact with the said stem.

4. For attachment to a non-conducting rod, a current conducting sleeve seatable on said rod, a translucent non-conducting member, an electric light bulb molded into said member, an electric light conductor extending from said sleeve to one contact of said light bulb, a stem molded into and projecting from said member, and an electric light wire connecting said stem with the other contact of the light bulb.

5. For attachment to a non-conducting rod, a current conducting sleeve seatable on said rod, a translucent non-conducting member, an electric light bulb molded into said member, an electric light conductor extending from said sleeve to one contact of said light bulb, means for attaching said conductor intermediate its ends to the rod above said current conducting sleeve, a stem molded into and projecting from said member, and an electric light wire connecting said stem with the other contact of the light bulb.

JOSEPH F. PROHASKA.

References Cited in the file of this patent

UNITED STATES PATENTS

| Number | Name | Date |
|---|---|---|
| 821,623 | Edison | May 29, 1906 |
| 1,562,971 | Kershaw et al. | Nov. 24, 1925 |
| 1,567,376 | McIntyre et al. | Dec. 29, 1925 |

FOREIGN PATENTS

| Number | Country | Date |
|---|---|---|
| 499,509 | Germany | June 7, 1930 |